2,861,979
BUTADIENE-FURFURAL REACTION PRODUCT

Mortimer T. Harvey, South Orange, and Peter L. Rosamilia, Newark, N. J., assignors to Harvel Research Corporation, a corporation of New Jersey No Drawing. Application July 6, 1954
Serial No. 441,656

12 Claims. (Cl. 260—67)

This invention relates to novel compositions of matter and to methods for preparing the same. In one of its more specific aspects the invention is directed to methods for treating furfural-butadiene reaction products and also to novel products produced thereby.

Prior to this invention furfural and butadiene 1,3 were reacted under varying conditions to produce a variety of reaction products. Some of the products of such reactions are dark colored tarry residues which may vary in consistency from dark practically solid, semi-solid to fairly fluid lighter colored liquid masses. Such masses are composed chiefly of complex mixtures of reaction products of butadiene and furfural in various molecular proportions generally 1:1 and/or 2:1 and with a substantial part being in polymeric form.

For a long time such dark colored, tarry masses were not found useful commercially and were long regarded and treated as useless, waste products presenting a disposal problem. Such by-products are formed during the extractive distillation of a $C_4$ hydrocarbon mixture containing butadiene employing furfural as the selective solvent and are generally known in the art as residues formed in the furfural extractive distillation method for purification of butadiene. In commercial practice as known to us, such by-products were disposed of by burning in some instances.

We have discovered that furfural-butadiene reaction products and particularly said by-products or waste products may be easily and readily polymerized to provide high molecular weight products finding utility in a number of different fields. Throughout this specification and claims all parts are by weight unless otherwise specifically indicated.

According to this invention said furfural-butadiene reaction products as well as said by-products or waste products, all of which will hereinafter be termed products (I) may be polymerized at a temperature of at least approximately 220° F. and generally in factory practice in the approximate temperature range of 250–450° F. in the presence of an alkaline agent in amount sufficient to increase the pH thereof to about 8. Said furfural-butadiene reaction products in general have a pH of approximately 5 and according to this invention the quantity and nature of the alkaline agent employed is such that the pH of said products is raised to a value of at least approximately 8 but may be as high as desired, depending upon the speed of reaction required. In factory practice we prefer to carry out said polymerization at a pH in the range of approximately 8 to approximately 12 although higher pH conditions as high as 13.5 may be employed. (The method for measuring the pH is to place 10 grams of the material whose pH is to be determined in 100 grams of distilled water, heat the mix to boiling while stirring, allow to cool to room temperature and take the pH by means of pH papers. The pH papers employed were those known as "Hydrion" by Micro Essential Labs. of Brooklyn, N. Y.) Said pH conditions in the range of approximately 8–13.5 are established at the beginning of the polymerization and reduce in the course of polymerization.

The polymerization may be continued to provide the desired degree of polymerization which may be as low as desired to provide polymers at least twice the molecular weight of the starting material up to and including the conversion of product (I) to the substantially solid and infusible state, that is, that it will be substantially solid at temperatures as high as 500° F. and at room temperature (70° F.) will be at least 80% insoluble when mixed with an equal part of furfural. Among some of the alkaline agents which may be employed in the practice of this invention are sodium hydroxide, potassium hydroxide, calcium hydroxide, etc., diethylene triamine, triethylenetetramine, ethanolamine, propylene diamine, 1,6 hexamethylene diamine, tetraethylene pentamine, etc., and the hydroxides are particularly suitable for polymerization to the solid and substantially infusible state.

Some of the starting materials, products (I) which may be employed in the practice of this invention and the methods for polymerizing them will be hereinafter set forth merely to illustrate the invention.

Example A

There is collected and obtained a batch of what is known in the art as the "polymeric residue formed in the furfural extractive distillation method for the purification of butadiene." (A report on such residues appears in an article entitled "Butadiene-Furfural Copolymers," by Hillyer et al., Ind. and Eng. Chem., vol. 40, November 1948, pp. 2216–2220 reference to which is hereby made.) Such residues, which for a long time were regarded as waste products, are generally combined with water and such masses contain an amount of water by weight in the range of 5%–20% of the mass, and such masses will hereinafter be termed (M).

Example B

If desired, said masses of water laden products (I) known as masses (M) may be heated at temperatures of 200° F.–400° F. either at atmospheric or reduced pressure conditions to substantially completely dehydrate the mass and when the higher temperatures in said range are employed, furfural-butadiene reaction products come off as a distillate and are collected and are hereinafter known as products (D), leaving behind a residual mass which is substantially completely dehydrated and having had fraction product (D) removed at least in part therefrom. Such dehydrated residual masses of said residues from which at least part of product (D) has been removed therefrom under vacuum, are known as products (R) and generally are dark colored tarry masses which vary in consistency from substantially solid, semi-solid, to fairly fluid lighter colored liquids, all being substantially soluble in furfural, and all being liquid or capable of exhibiting flow at 400° F. and having softening point (Ball and Ring) no greater than 300° F., and all being at least 50% soluble in acetone. The distillates which are known as products (D) are free flowing liquids soluble in furfural and being at least 50% soluble in acetone and also have softening point (Ball and Ring) greatly below 200° F. and also are liquid at temperatures of 300° F., are furfural-butadiene reaction products and apparently in the main comprising copolymeric butadiene and furfural, with the mole ratio of butadiene to furfural being 2 to 1. The consistency of the masses (M) both before and after dehydration, with or without the removal of products (D) therefrom and the yields of products (D) vary depending upon the conditions of operation of the main extractive distillation units as well as the distillation units in the furfural extractive distillation method used.

Illustrative examples of products (I) employed in the practice of the invention are the masses (M), also such masses (M) which have been dehydrated and from which 0–20% by weight thereof calculated on a dry basis has been distilled off, and also such masses (M) which have been dehydrated and from which 20%–40% by weight thereof calculated on a dry basis has been distilled off, and also the residual masses (R), and the distillates (D). However, we are primarily concerned with said products (I) which have a molecular weight of at least 330, viscosity of at least 2000 centipoises at 25° C. and softening point (Ball and Ring) of at least 60° F. are soluble in furfural, and are liquid at 300° F.

*Example 1*

200 parts by weight of any of said products (I) is mixed with an alkaline agent and preferably a strong alkaline agent or catalyst in amount equal to approximately 1–20 parts of sodium hydroxide or an amount of another alkaline agent or catalyst polymerizing equivalent of approximately 1–20 parts of sodium hydroxide to increase the pH thereof to a value between approximately 8–14. The temperature of the mix is elevated to at least approximately 250° F. and maintained thereat or in the range of approximately 250–450° F. at pressures between 200 lbs. per sq. in. to 5 mm. of Hg pressure until the desired degree of polymerization is attained and may, if desired, be continued until the organic mass is converted to the substantially solid and infusible state and in that state the mass is substantially solid at 500° F. and is substantially insoluble in furfural and also in acetone. It is preferable that the alkaline agent be first dissolved in a solvent when that agent is a strong alkaline agent such as sodium hydroxide and a solution thereof added to the product (I) to be polymerized to obtain an easier and more uniform mixture and to prevent local action. By employing this method there may be produced a great variety of polymers of product (I) some of which are liquid at 450° F. and others are solid at this temperature, the former being useful for chemical and physical combination with other substances, such as (II) normally solid polymers of vinyl esters, such as vinyl chloride, vinyl acetate, etc. and copolymers of vinyl acetate and vinyl chloride, polyvinyl acetals such as polyvinyl formal, polyvinyl butyral, polyvinyl acetal; (III) formaldehyde, paraformaldehyde, trioxane, etc.; (IV) natural rubber, reclaimed rubber, chlorinated rubber, normally solid or rubbery polymers of chloroprene, homopolymers of butadiene 1,3, normally solid copolymers of butadiene 1,3 and styrene or acrylonitrile, or "polyethylene polysulphide rubbers" known as "Thiokol"; (V) acetone-formaldehyde organic reaction products soluble in an equal volume of water; (VI) monomeric or polymeric cashew nut shell liquid, cardanol, carol, residues of cashew nut shell liquid produced by the heat distillation of cashew nut shell liquid under atmospheric or subatmospheric conditions or by steam distillation which measure 75–50% by weight of said cashew nut shell liquid, as well as said monomers and polymers being hydrogenated to saturate the double bonds thereof in their side chains, with said monomers and polymers all being liquid at 300° F.; (VII) reaction products of any one or a combination of two or more of said (IV) or an aldehyde reactive phenol, such as hydroxybenzene, cresol, xylenol, anthranol and their homologues with an aldehyde, such as formaldehyde, paraformaldehyde, trioxane, glyoxal, furfuraldehyde, etc., which reaction products and the manner for producing them are well known to the art. These various combinations provide a variety of unique and highly useful materials finding application in the rubber art generally and especially in cable covering, in the art of coatings, castings, floor coverings, table tops, diaphragm cloths, friction elements such as brake linings and clutch facings and in other fields as well.

*Example 2*

800 lbs. of raw residue obtained from a Texas plant of the Phillips Petroleum Company of Bartlesville, Oklahoma, was an illustrative material used. The raw residue was the water laden residue obtained as a by-product or waste product in the purification of butadiene in which the furfural extractive distillation method was employed by that company. This particular residue was quite heavy and a layer of water had separated out and floated on top of the residue. Most of the water layer was dipped off. Then to the residue which still contained an appreciable quantity of water and was transferred to a kettle, was added an aqueous solution consisting of 8 lbs. of sodium hydroxide in 8 lbs. of water and the mass was agitated to distribute the sodium hydroxide throughout the residue. Then the mass was heated to a temperature of approximately 320–340° F. and maintained at that temperature while under subatmospheric conditions and a pressure of approximately 5–125 mm. of mercury pressure to substantially completely dehydrate the residue and to polymerize it to a softening point (Ball and Ring) of 165° F. The polymerized product so produced is solid at room temperature but liquid or will flow at 300° F. and is hereinafter known as product IAP. The viscosity of the polymerized product compared with a sample of the residue was such that a solution of 10 parts of the former in 5 parts of furfural exhibited a viscosity at 25° C. at least 100% and approximately 200% greater than that of a solution of 10 parts of the latter in 5 parts of furfural. If desired, heating may be continued in the higher temperature range from 400–450° F. whereby the residue was converted to a substantially infusible mass being substantially solid at 500° F. and being at least 80% insoluble in furfural. The infusible mass may be comminuted by means of a hammer mill to provide finely divided material known as product IAF useful as friction fortifying material which may be employed as discrete particles in brake linings and clutch facings.

*Example 3*

Into an oven maintained at 260–280° F. was placed a steel drum containing 485 lbs. of raw residue obtained from a Texas plant of the Phillips Petroleum Company of Bartlesville, Oklahoma, and being a residue obtained as a by-product in the purification of butadiene in which the furfural extractive distillation method was employed by that company. Said residue is allowed to stand in that oven at that temperature for a period of about 15–18 hours whereupon said residue was completely dehydrated and some of the higher volatiles originally contained therein had been driven off. At the end of that period the mass in the container was weighed and found to be 412 lbs. of a dark, thick, yet fluid mass soluble in furfural, having an average molecular weight above 330, having a viscosity above 2000 centipoises at 25° C. and having a melting point (Ball and Ring) above 60° F. This product is hereinafter known as product IB. The entire 412 lb. mass may be transferred to a closed kettle, vented to the atmosphere through which distillates may pass and be collected, and heated to approximately 425° F. and maintained at that temperature for approximately 2 to 5 hours. Then the source of heat may be removed and the resultant mass poured into pans and allowed to cool to room temperature. At this temperature the mass will be a thermoplastic solid insoluble in hot and cold V. M. P. naphtha and will have a melting point (Ball and Ring) of 178° F. consisting chiefly of a highly polymerized reaction mass weighing approximately 305 lbs. This product is hereinafter known as product IBR. All the distillates are collected and combined and then dehydrated at 220° F. while under 28" vacuum. The dehydrated combined distillates are known as products IBD. To the combined distillates either dehydrated or not and preferably the dehydrated mass has added thereto a solution consisting of 33 parts by weight of potassium hydroxide in 66 parts by weight of water. The quantity of said solution added is equal to 10 parts thereof to 100 parts of said distillate on a dry basis. The mass is mixed together and heated up to and maintained at 300° F. while being stirred and under such conditions after 15 hours is polymerized to such a degree that when cooled to room temperature it is a thermoplastic solid having a softening point (Ball and Ring) of approximately 200° F. and this product is known hereinafter as product IBDP. Heating may be continued, but at 400° F., to convert the mass to the substantially solid and infusible state when it will be at least 80% insoluble in furfural and will still be substantially solid at 500° F. and is known as product IBDF. This product may be comminuted with a hammer mill.

To 100 lbs. of product IB were mixed 6 lbs. of an aqueous solution consisting of 2 lbs. of sodium hydroxide in 4 lbs. of water. The mix was heated to and maintained at approximately 300° F. under atmospheric conditions until a solution of a 10-gram sample thereof at 25° C. dissolved in 5 grams of furfural had a viscosity at 25° C. about 4 times that of a solution of a 10-gram sample of the original product IB disolved in 5 grams of furfural. At this stage the mass is quickly cooled and there is added thereto an agent to neutralize the alkaline catalyst, if desired, and the polymerized product is hereinafter known as product IBP which is liquid at 300° F. and soluble in furfural or acetone. If desired the heating may be continued under said alkaline conditions until the mass is converted to the solid, infusible state and in this state is substantially solid at 500° F. and at least 80% insoluble in furfural and this product is known herein as product IBF.

To 100 lbs. of IBR which is heated to about 300° F. is added 2 lbs. of an aqueous solution consisting of equal parts by weight of sodium hydroxide and water. The temperature of the mix is raised to and maintained at 400° F. until it has been converted to the substantially solid and infusible state, and in this state is substantially solid at 500° F., at least 80% insoluble in furfural and is hereinafter known at product IBRF.

*Example 4*

Following the same procedure as that employed in either Example 1 or 2 and employing raw residue obtained either from the Neches Butane Products Company of Texas or the Sinclair Rubber Inc. also of Texas, there are obtained distillates and residual fractions of the raw residue. The raw residue, either as is or dehydrated, known herein as product ID, as well as the distillates and residual fractions of the residue, known herein respectively as products IDD and IDR, may be polymerized under alkaline conditions employing 100 parts by weight of any of them together with 1.5 part of potassium hydroxide and heating the mixture at 325° F. to polymerize to the degrees set forth in Example 1 or 2 and in which state they are liquid at 350° F. and soluble in furfural, said products being known herein as products IDP, IDDP and IDRP respectively, or to convert them to the substantially solid and infusible state and in said state are substantially solid at 500° F. and said products are known respectively as products IDF, IDDF and IDRF.

*Example 5*

100 parts of any one of said products (I) as, for example, the dehydrated raw residue of Example 2, is charged into an autoclave with a stirrer. Thereto is added 2 parts of an aqueous solution consisting of equal parts by weight of sodium hydroxide and water. The stirrer is in operation throughout this entire process. Heat is applied to remove all of the water then the autoclave is sealed. While constantly being stirred, the mass is heated to approximately 350° F. and maintained at that temperature and compressed air is added thereto to raise the pressure therein to a value of approximately 100 lbs. per sq. in. These conditions are maintained until a 10 part sample thereof in 5 parts of furfural produces a solution having a viscosity at 25° C. approximately 200% greater than that of a solution of 10 parts of the original dehydrated raw residue in 5 parts of furfural. This product is liquid at 500° F. or below and is known herein as product IEP. Of course it is to be understood that the aforementioned conditions may be maintained for a longer period of time to further increase the viscosity or the thickening of the raw residue originally contained therein. It is also to be understood that the various distillates and residues of the raw residues may be polymerized under alkaline conditions and superatmospheric pressures as illustrated in this example to provide novel products which may be liquid at 500° F. or below and are respectively known as products IEDP and IERP. All of said respective products IEP, IEDP and IERP may either under alkaline or acidic conditions be maintained for 24 hours at 400° F. whereupon they will have been converted to the solid and substantially infusible state and will be at least 80% insoluble in furfural and solid at 500° F., and such products are hereinafter known as products IEF, IEDF and IERF.

All of the various polymerized or thickened butadienefurfural reaction products which are liquid at temperatures of 500° F. or below and examples of which have herein been identified as products IAP, IBDP, IBP, IDP, IDRP, IDDP, IEP, IEDP and IERP may each be thickened or polymerized under acidic or alkaline conditions to convert them to the substantially solid and infusible state after which masses thereof may be ground or comminuted to a fine dust and such dusts employed as friction fortifying particles in the various binders heretofore known in the art in the production of the so-called asbestos brake linings. They also may be employed as binders in the production of said friction elements.

Said thickened or alkaline polymerized products may also be employed as reactants with other materials as heretofore set forth or may be combined with various polymers and copolymers such as the normally solid polymers of vinyl acetate, vinyl chloride, and copolymers of vinyl acetate and vinyl chloride. Generally the ratio of the former to the latter is approximately 5-2000 parts of the said alkaline polymerized or thickened butadienefurfural product to 100 parts of the one or a combination of two or more of said normally solid polymers or copolymers. The ratio of course is dependent upon the viscosity of the particular alkaline polymerized butadienefurfural reaction product employed as well as the rigidity or other characteristics of the desired combination. In general said combinations may be produced by mixing together the desired alkaline polymerized butadiene-furfural reaction product together with the desired proportions of the normally solid vinyl polymers or copolymers. The mixture is then heated to obtain a substantially uniform mass which may be cast into suitable molds or otherwise treated, for example, may be extruded or in any other manner to provide highly useful and novel end products finding application in the field of floor covering, tubing and insulation.

Said polymers which are liquid at 500° F. or below may also be compounded with various normally solid materials such as natural rubber, reclaimed rubber, homopolymers of butadiene, polymers of chloroprene, copolymers of butadiene and styrene and copolymers of butadiene and acrylonitrile. In general, one or a combination of two or more of said normally solid materials may be combined with one or a combination of two or more of said alkaline polymers or thickened products in any number of different ways and generally with other components such as fillers, vulcanizers, accelerators, etc. and subsequently cured for obtaining novel and improved rubbery products which may be either flexible or rigid, hard or soft, depending upon the characteristics desired. By employing these various combinations it is possible to produce improved rubber stocks having good ozone resistance and other novel and highly useful characteristics. A number of different methods and apparatus may be employed for making such compositions examples of which are a rubber mill as well as the so-called Banbury mixer or other types of mixers. The ratio by weight of said alkaline polymers or thickened butadiene-furfural reaction products to the quantity of said normally solid may vary over a wide range, for example, from 3–50 parts of the former to 100 parts of the latter.

These various alkaline polymers or thickened butadiene-furfural reaction products which are in the liquid condition also find application as impregnants for fabrics, wood, paper and the like and also may be employed as an adhesive for laminating together such materials. They may be spread between adjacent surfaces of components to be laminated which then may be placed under pressure and the polymers may be, if desired, cured to the substantially solid and infusible state under pressure and under either acidic or alkaline conditions.

The various infusible products may be comminuted and employed together with asbestos and a suitable binder to provide novel friction elements such as brake linings and clutch facings. In such elements they are present as discrete particles throughout the binder.

Since certain changes in carrying out the aforesaid processes and certain modifications in the compositions which embody the invention may be made without departing from its scope, it is intended that all matter contained in the description shall be interpreted as illustrative and not in a limiting sense.

It is also to be understood that the following claims are intended to cover all the generic and specific features of the invention herein described and all statements of the scopes of the invention, which as a matter of language might be said to fall therebetween; and that they are intended to be inclusive in scope and not exclusive, in that, if desired, other materials may be added to my novel compositions of matter herein claimed without departing from the spirit of the invention. Particularly it is to be understood that in said claims, ingredients or components recited in the singular are intended to include compatible mixtures of said ingredients wherever the sense permits.

This application is a continuation-in-part of our applications Serial No. 211,576, filed February 17, 1951; 238,376 of July 24, 1951; 338,876, filed February 25, 1953; 360,827, filed June 10, 1953, and 435,621, filed June 9, 1954.

Having thus described our invention, what we claim is:

1. The method for homopolymerizing butadiene 1,3-furfural reaction product having molecular weight of at least 330, viscosity of at least 2,000 centipoises at 25° C. and softening point (Ball and Ring) of at least 60° F. and being soluble in furfural and being liquid at 300° F., comprising heating to a temperature in an approximate temperature range of 250–450° F. a mixture having a pH of at least approximately 8 and comprising said butadiene-furfural reaction product and alkaline agent in such amount as to provide such a pH, said heating continued at least until a solution of a 10-gram sample thereof dissolved in 5 grams of furfural has a viscosity at 25° C. at least 100% greater than that of a solution of a 10-gram sample of said original reaction product in 5 grams of furfural.

2. The method for homopolymerizing butadiene 1,3-furfural reaction product having molecular weight of at least 330, viscosity of at least 2,000 centipoises at 25° C. and softening point (Ball and Ring) of at least 60° F. and being soluble in furfural and being liquid at 300° F., comprising heating to a temperature in an approximate temperature range of 250–450° F., a mixture having a pH of at least approximately 8 and comprising said butadiene-furfural reaction product and alkaline agent in such amount as to provide such a pH, said heating continued until said mass is converted to the substantially solid and infusible state.

3. The method for homopolymerizing an organic product containing butadiene 1,3-furfural reaction product and having molecular weight of at least 330, viscosity of at least 2,000 centipoises at 25° C. and softening point (Ball and Ring) of at least 60° F. and being soluble in furfural and being liquid at 300° F., and selected from the group consisting of (a) residues obtained in the furfural extractive distillation method for the purification of butadiene (b) organic distillates and residual fractions obtained by the heat distillation of (a), comprising heating in an approximate temperature range of 250–450° F. a mixture having a pH of at least approximately 8 and comprising said organic product and alkaline agent in such amount as to provide such a pH, said heating continued at least until a solution of a 10-gram sample thereof dissolved in 5 grams of furfural has a viscosity at 25° C. at least 100% greater than that of a solution of a 10-gram sample of said original reaction product in 5 grams of furfural.

4. The method for homopolymerizing an organic residue containing butadiene 1,3-furfural reaction product and obtained in the furfural extractive distillation method for the purification of butadiene having molecular weight of at least 330, viscosity of at least 2,000 centipoises at 25° C. and softening point (Ball and Ring) of at least 60° F. and being soluble in furfural and being liquid at 300° F., comprising heating in an approximate temperature range of 250–450° F. a mixture having a pH of at least approximately 8 and comprising said residue and alkaline agent in such amount as to provide such a pH, said heating continued at least until a solution of a 10-gram sample thereof dissolved in 5 grams of furfural has a viscosity at 25° C. at least 100% greater than that of a solution of a 10-gram sample of said original organic residue in 5 grams of furfural.

5. The method for polymerizing a normally liquid organic fraction containing butadiene 1,3-furfural reaction product and obtained by the heat distillation of residue obtained in the furfural extractive distillation method for the purification of butadiene, having molecular weight of at least 330, viscosity of at least 2,000 centipoises at 25° C. and softening point (Ball and Ring) of at least 60° F. and being soluble in furfural and being liquid at 300° F., comprising heating in an approximate temperature range of 250–450° F. a mixture having a pH of at least approximately 8 and comprising said liquid fraction and alkaline agent in such amount as to provide such a pH, said heating continued at least until a solution of a 10-gram sample thereof dissolved in 5 grams of furfural has a viscosity at 25° C. at least 100% greater than that of a solution of a 10-gram sample of said original liquid fraction in 5 grams of furfural.

6. The method for homopolymerizing a residual fraction containing butadiene 1,3-furfural reaction product and having molecular weight of at least 330, viscosity of at least 2,000 centipoises at 25° C. and softening point (Ball and Ring) of at least 60° F. and being soluble in furfural and being liquid at 300° F., and obtained by the heat distillation of residue obtained in the furfural extractive distillation method for the purification of butadiene, comprising heating in an approximate temperature range of 250–450° F. a mixture having a pH of at least approximately 8 and comprising said residual fraction and an alkaline agent in such amount as to provide such a pH, said heating continued at least until a solution of a 10-gram sample thereof dissolved in 5 grams of furfural has a viscosity at 25° C. at least 100% greater than that of a solution of a 10-gram sample of said original residual fraction dissolved in 5 grams of furfural.

7. A product made according to claim 1.
8. A product made according to claim 2.
9. A product made according to claim 3.
10. A product made according to claim 4.
11. A product made according to claim 5.
12. A product made according to claim 6.

References Cited in the file of this patent

UNITED STATES PATENTS

| | | |
|---|---|---|
| 1,933,716 | Day | Nov. 7, 1933 |
| 2,683,151 | Hillyer et al. | July 6, 1954 |
| 2,687,419 | Hillyer | Aug. 24, 1954 |